US010207586B2

(12) United States Patent
Trischler

(10) Patent No.: US 10,207,586 B2
(45) Date of Patent: Feb. 19, 2019

(54) CONTROL PANEL

(71) Applicant: John D. Trischler, Greenwood, IN (US)

(72) Inventor: John D. Trischler, Greenwood, IN (US)

( * ) Notice: Subject to any disclaimer, the term of this patent is extended or adjusted under 35 U.S.C. 154(b) by 0 days.

(21) Appl. No.: 15/493,501

(22) Filed: Apr. 21, 2017

(65) Prior Publication Data

US 2017/0305272 A1 Oct. 26, 2017

Related U.S. Application Data

(60) Provisional application No. 62/326,479, filed on Apr. 22, 2016.

(51) Int. Cl.
*B60K 37/06* (2006.01)
*B60Q 3/82* (2017.01)
*B60R 7/04* (2006.01)

(52) U.S. Cl.
CPC .............. *B60K 37/06* (2013.01); *B60Q 3/82* (2017.02); *B60R 7/04* (2013.01); *B60K 2350/925* (2013.01)

(58) Field of Classification Search
CPC .... B60K 2350/925; B60K 37/06; B60Q 3/82; B60R 7/04
USPC ...................................................... 296/24.34
See application file for complete search history.

(56) References Cited

U.S. PATENT DOCUMENTS

| 5,475,577 A | 12/1995 | Vanderhoof et al. |
| 5,609,382 A | 3/1997 | Schmid et al. |
| 6,123,377 A * | 9/2000 | Lecher ............... B60H 1/00985 180/315 |
| 2016/0344221 A1* | 11/2016 | Kramer ................... H02J 7/025 |

* cited by examiner

*Primary Examiner* — Joseph D. Pape
*Assistant Examiner* — Dana D Ivey
(74) *Attorney, Agent, or Firm* — Daniel C. Pierron; Widerman Malek, PL

(57) ABSTRACT

A control panel comprising a proximal wall, a pair of opposing sidewalls attached at a proximal edge thereof to and extending distally from the proximal wall, a distal wall attached to a distal edge of the pair of opposing sidewalls, and a panel wall attached to an upper portion of and carried by at least one of the proximal wall, one of the opposing sidewalls, and the distal wall. The panel wall comprises at least one aperture formed therein configured to receive a control device.

19 Claims, 3 Drawing Sheets

CONTROL PANEL

RELATED APPLICATIONS

This application claims the benefit under 35 U.S.C. § 119(e) of U.S. Provisional Patent Application Ser. No. 62/326,479 filed on Apr. 22, 2016, the entire content of which is incorporated herein by reference.

FIELD OF THE INVENTION

The present invention relates to control panels for vehicles.

BACKGROUND

Vehicles in production have an increasing number and variety of control devices, such as buttons and dials, as well as other electronics. There is a persistent challenge for aftermarket vendors to find suitable locations within the cabin of vehicles to install or mount aftermarket control panels to operate electronics associated with the vehicle, including aftermarket electronics, such as, but not limited to, light-emitting diode (LED) lights, winches, audio equipment, and video equipment. Accordingly, there is a need in the art to take advantage of available space within the cabin of a vehicle to mount a control panel.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a control panel comprising a proximal wall, a pair of opposing sidewalls attached at a proximal edge thereof to and extending distally from the proximal wall, a distal wall attached to a distal edge of the pair of opposing sidewalls, and a panel wall attached to an upper portion of and carried by at least one of the proximal wall, one of the opposing sidewalls, and the distal wall. The panel wall may comprise at least one aperture formed therein configured to receive a control device.

In some embodiments, the at least one aperture may have a length within a range from 37 millimeters to 38 millimeters and a width within a range from 21 millimeters to 22 millimeters. The control panel may comprise a proximal aperture, a distal aperture, and at least one medial aperture positioned intermediate the proximal aperture and the distal aperture.

In some embodiments, the panel wall may be configured to extend outwardly beyond at least one of the proximal wall, the opposing sidewalls, and the distal wall, defining a lip that is configured to interface with a structure of a center console of a vehicle. The lip may extend at least 1.5 millimeters outward beyond at least one of the proximal wall, the opposing sidewalls, and the distal wall. The lip may extend within a range from 1.70 millimeters to 1.75 millimeters outward from at least a portion of at least one of beyond the proximal wall, the opposing sidewalls, and the distal wall.

In some embodiments, at least two of the proximal wall, the opposing sidewalls, the distal wall, and the panel wall are integrally formed.

The panel wall may have a length within a range from 235 millimeters to 240 millimeters, a width within a range from 33 millimeters to 34 millimeters, and a thickness within a range from 2.7 millimeters to 2.8 millimeters. Each of the proximal wall, the opposing sidewalls, and the distal wall may have a height within a range from 26 millimeters to 27 millimeters. The distal wall may be slanted to form an angle with the panel wall within a range from 40 degrees to 50 degrees. In some embodiments, the angle formed may be 45 degrees.

In some embodiments, the control panel may comprise a lower aperture defined by lower edges of the proximal wall, the opposing sidewalls, and the distal wall. The control panel may further comprise a lower void defined by lower edges of the proximal wall, the opposing sidewalls, and the distal wall.

The control device may comprise at least one of a toggle switch, a rotary dial, a light-emitting diode (LED), a rocker switch, a push button, and a round switch positioned at least partially within the aperture and attached to the panel wall.

In some embodiments, the control panel may further comprise a storage aperture configured to facilitate the storage and retrieval of items within a storage tray within which the control panel is at least partially positioned within. The control panel may be configured to be positioned at least partially within at least one of a void and a storage tray comprised by a center console of a vehicle.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a control panel that can be used to retrofit a vehicle to provide additional control capabilities. Specifically, the control panel may be configured to be inserted and attached to at least one of a void and a storage tray of a center console of a vehicle, be attached to the center console, and comprise one or more control devices positioned to be readily accessible by an occupant of the vehicle.

Figure 1:
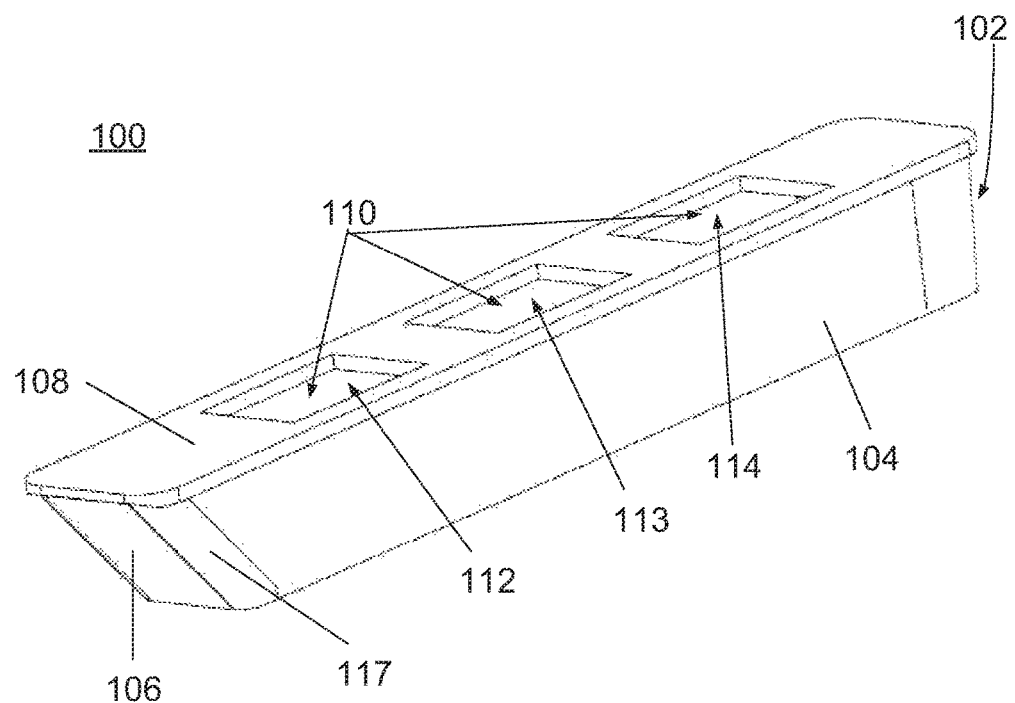
FIG. 1 is a perspective view of a control panel according to an embodiment of the invention
Figure 2:
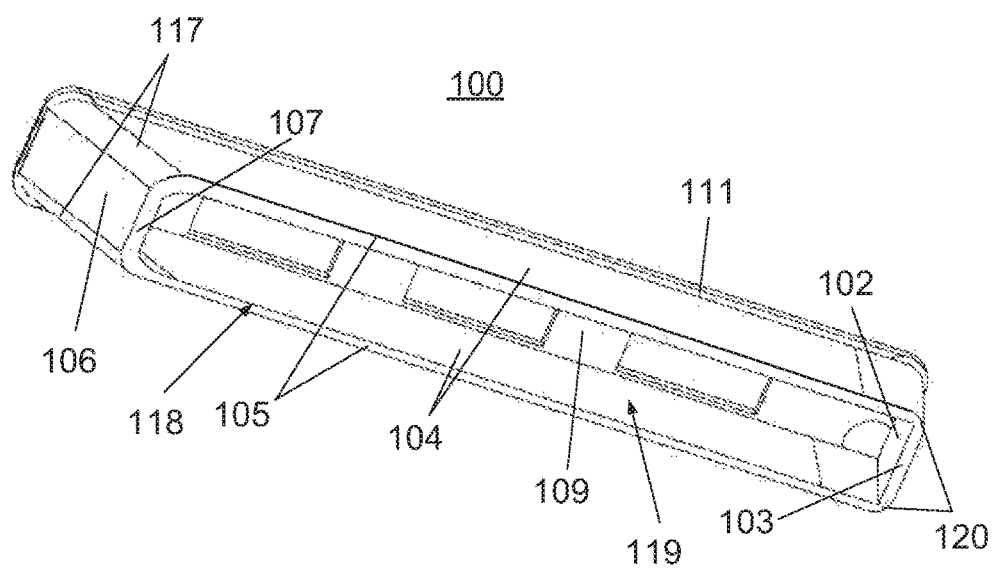
FIG. 2 is a lower perspective view of the control panel of FIG. 1.
Figure 3:
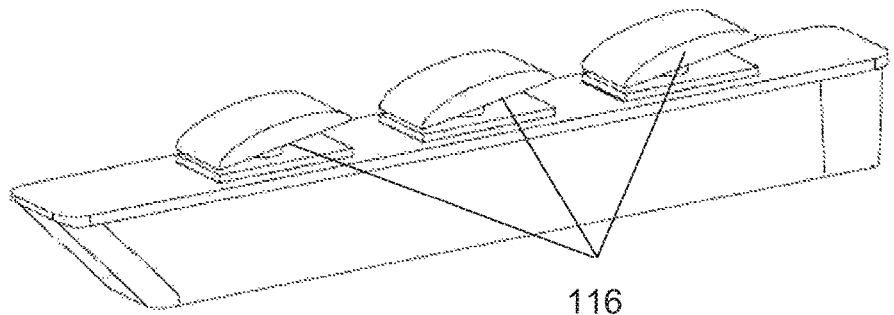
FIG. 3 is a perspective view of the control panel of FIG. 1 further comprising a plurality of control devices.

Referring now to FIGS. 1-3, a control panel 100 according to an embodiment of the invention is presented. The control panel 100 may comprise a proximal wall 102, a pair of opposing sidewalls 104, and a distal wall 106. The proximal wall 102 may be generally vertical, including a lower edge 103. In some embodiments, the proximal wall 102 may include chamfer sections 120. The opposing sidewalls 104 may at least one of interface with, attach to, or be integrally formed with the proximal wall 102 and at a distal edge thereof and extend generally distally. The opposing sidewalls 104 may be generally parallel to one another. Additionally, the opposing sidewalls 104 may each have a lower edge 105 that may be co-planar with each other. The control panel 100 may further comprise one or more control devices 116, as is best illustrated in FIG. 3.

The distal wall 106 may at least one interface with, attach to, or be integrally formed with the opposing sidewalls 104 at a distal edge of the opposing sidewalls 104. The distal wall 106 may be slanted so as to extend generally distally and upward. The slant of the distal wall 106 may be such that it forms an angle with the panel wall 108 within the range from 40 degrees to 50 degrees. Additionally, the distal wall 106 may include chamfer sections 117 and a lower edge 107. Each of the proximal wall 102, the opposing sidewalls 104, and the distal wall 106 may have a vertical measurement, understood as a height, within a range from 26 millimeters to 27 millimeters.

In some embodiments, each of the proximal wall 102 and the distal wall 106 may be positioned so as to define proximal and distal ends, respectively, of the control panel 100 in conjunction with the panel wall 108, and may therefore be considered end walls.

The panel wall 108 may be configured to be at least one of attached to and integrally formed with an upper portion of at least one of the proximal wall 102, the opposing sidewalls, and the distal wall 106. In some embodiments, the panel wall 108 may be at least one of attached to and integrally formed with each of the proximal wall 102, the opposing sidewalls, and the distal wall 106. In some embodiments, the panel wall 108 may have a length within a range from 235 millimeters to 240 millimeters, a width within a range from 33 millimeters to 34 millimeters, and a thickness within a range from 2.7 millimeters to 2.8 millimeters.

As mentioned hereinabove, various combinations of the proximal wall 102, opposing sidewalls 104, distal wall 106, and panel wall 108 may be integrally formed. Accordingly, in some embodiments, at least two of the proximal wall 102, opposing sidewalls 104, distal wall 106, and panel wall 108 may be integrally formed. In some embodiments, the proximal wall 102, opposing sidewalls 104, distal wall 106, and panel wall 108 may all be integrally formed as a single structure.

The panel wall 108 may be configured to extend outwardly from at least one of the proximal wall 102, the opposing sidewalls 104, and the distal wall 106 by some distance, thereby defining a lip 111. The lip 111 may be dimensioned so as to facilitate the interfacing with a structure of a center console of a vehicle to facilitate the installation of the control panel 100 within the center console. In some embodiments, the lip 111 may extend outwardly from at least one of the proximal wall 102, the opposing sidewalls 104, and the distal wall 106 by at least 1.5 millimeters. In some embodiments, at least a portion of the lip 111 may extend outwardly from at least one of the proximal wall 102, the opposing sidewalls 104, and the distal wall 106 within the range from 1.70 millimeters to 1.75 millimeters. In some embodiments, at least a portion of the lip 111 may extend outwardly from each of the proximal wall 102, the opposing sidewalls 104, and the distal wall 106 within the range from 1.70 millimeters to 1.75 millimeters The panel wall 108 may further comprise at least one aperture 110 formed therein. The aperture 110 may be formed at any position within the panel wall 108. The aperture 110 may be configured to permit a control device 116 to be positioned therewithin. The positioning of the control device 116 within the aperture 110 may removably attach the control device 116 to the control panel 100. The aperture 110 may be formed within the panel wall 108 at a distance from at least one of the proximal wall 102, the opposing sidewalls 104, and the distal wall 106. The distance between the aperture 110 and the at least one of the proximal wall 102, the opposing sidewalls 104, and the distal wall 106 may facilitate the attachment of the control device 116 to the panel wall 108 by providing sufficient distance for an interference member of the control device 116 to engage with a lower surface 109 of the panel wall 108. In some embodiments, the aperture may have a length within a range from 37 millimeters to 38 millimeters and a width within a range from 21 millimeters to 22 millimeters.

In some embodiments, the panel wall 108 may comprise a plurality of apertures 110. In the present embodiment, the panel wall 108 comprises a proximal aperture 112, a distal aperture 113, and a medial aperture 114. In some embodiments, the panel wall 108 may comprise at least one or a plurality of medial apertures 114. The apertures 110 may be dimensioned identically or differently. Moreover, the apertures 110 may be configured to accommodate control devices 116 of the same type or of different types, having different dimensional requirements to be positioned within the apertures 110.

The lower edges 103, 105, 107 of the proximal wall 102, opposing sidewalls 104, and the distal wall 106, respectively, may collectively be co-planar and/or define a lower aperture 118. The lower aperture 118 may be configured so as to permit wiring associated with the control devices 116 to pass therethrough to be connected to other componentry of the vehicle into which the control panel 100 may be installed. Moreover, the control panel 100 may comprise an internal void 119 defined by the proximal wall 102, opposing sidewalls 104, distal wall 106, and panel wall 108.

Figure 4:
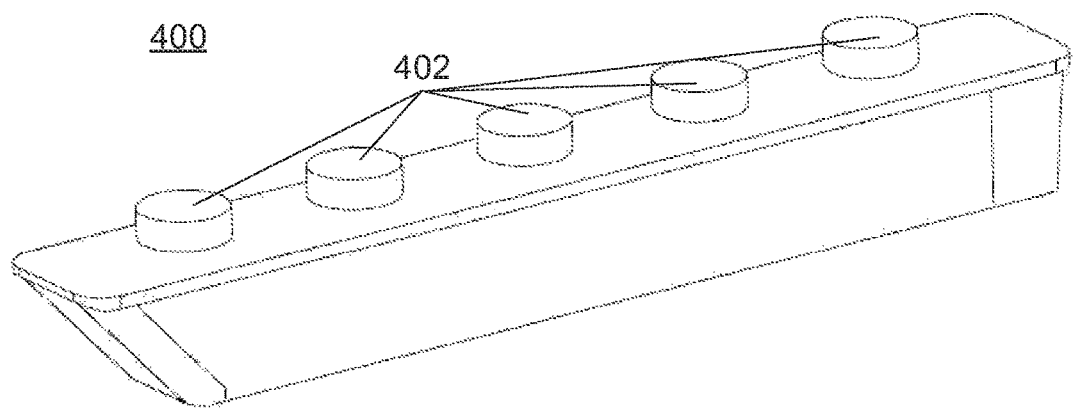
FIG. 4 is a perspective view of a control panel according to another embodiment of the invention.
Figure 5:
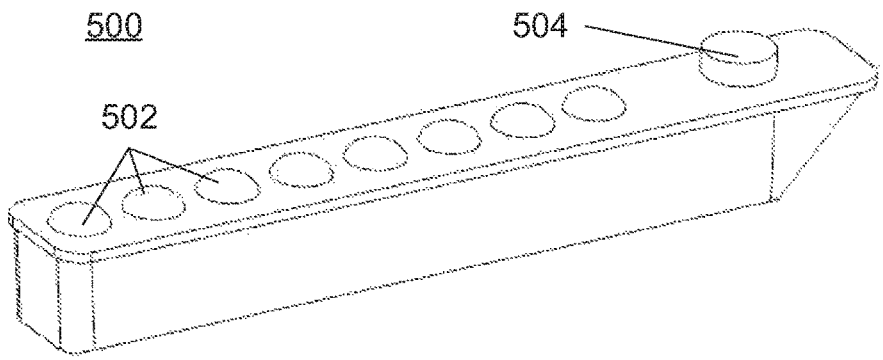
FIG. 5 is a perspective view of a control panel according to another embodiment of the invention.

Control panels according to various embodiments of the invention may comprise multiple control devices, either of the same type or of varying types. Accordingly, differing types of control devices are contemplated and included within the scope of the invention. In the embodiment presented in FIG. 3, the control panel 100 comprises control devices 116 that are rocker switches. Other embodiments, such as the control panel 400 presented in FIG. 4, may comprise one or more rotary dials 402. Other embodiments, such as the control panel 500 presented in FIG. 5, may comprise a plurality of LEDs 502 as well as an additional control device 504. Accordingly, it is contemplated and included within the scope of the invention that the control device of the various embodiments of the invention may comprise at least one of the control device comprises at least one of a toggle switch, a rotary dial, an LED, a rocker switch, a push button, and a round switch.

Figure 6:
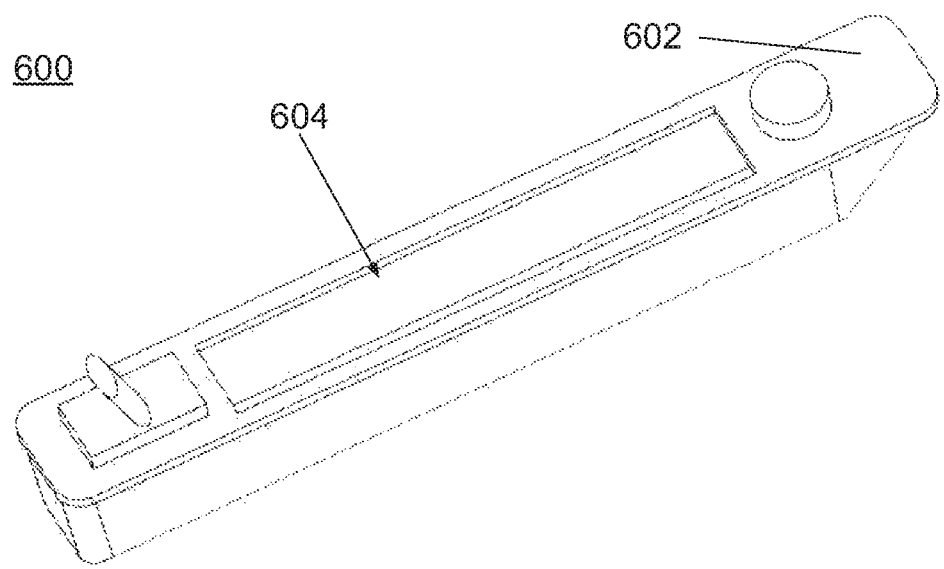
FIG. 6 is a perspective view of a control panel according to another embodiment of the invention.

Referring now to FIG. 6, a control panel 600 according to another embodiment of the invention is presented. A panel wall 602 of the control panel 600 comprises a storage aperture 604. The storage aperture may be configured to permit the positioning of items within a storage tray that the control panel 600 may be at least partially positioned within.

Figure 7:
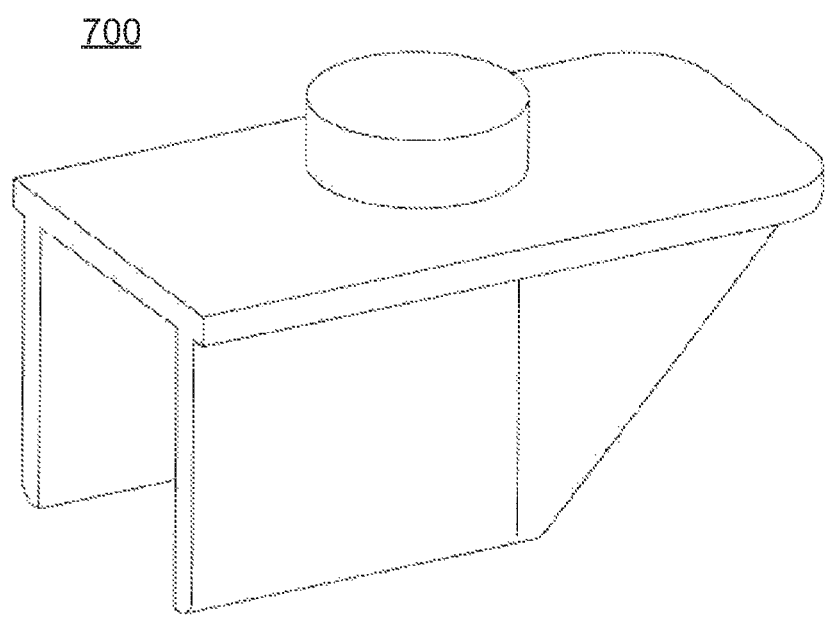
FIG. 7 is a perspective view of a control panel according to another embodiment of the invention.

Referring now to FIG. 7, a control panel 700 according to another embodiment of the invention is presented. The control panel 700 may be configured to occupy only a portion of space defined by at least one of a void and a storage tray comprised by a center console of a vehicle. In the present embodiment, the control panel 700 does not comprise a structure corresponding to the proximal wall 102 of the control panel 100 of FIGS. 1-3. In alternative embodiments, the control panel 700 may comprise a structure analogous to the proximal wall 102 of the control panel 100 of FIGS. 1-3.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A control panel comprising:
   a proximal wall;
   a pair of opposing sidewalls attached at a proximal edge thereof to and extending distally from the proximal wall;
   a distal wall attached to a distal edge of the pair of opposing sidewalls; and
   a panel wall attached to an upper portion of and carried by at least one of the proximal wall, one of the opposing sidewalls, and the distal wall, the panel wall being configured to extend outwardly beyond at least one of the proximal wall, the opposing sidewalls, and the distal wall, defining a lip that is configured to interface with a structure of a center console of a vehicle;
   wherein the panel wall comprises at least one aperture formed therein configured to receive a control device.

2. The control panel of claim 1 wherein the at least one aperture has a length within a range from 37 millimeters to 38 millimeters and a width within a range from 21 millimeters to 22 millimeters.

3. The control panel of claim 1 comprising a proximal aperture, a distal aperture, and at least one medial aperture positioned intermediate the proximal aperture and the distal aperture.

4. The control panel of claim 1 wherein the lip extends at least 1.5 millimeters outward beyond at least one of the proximal wall, the opposing sidewalls, and the distal wall.

5. The control panel of claim 4 wherein the lip extends within a range from 1.70 millimeters to 1.75 millimeters outward from at least a portion of at least one of beyond the proximal wall, the opposing sidewalls, and the distal wall.

6. The control panel of claim 1 wherein at least two of the proximal wall, the opposing sidewalls, the distal wall, and the panel wall are integrally formed.

7. The control panel of claim 1 wherein the panel wall has a length within a range from 235 millimeters to 240 millimeters and a width within a range from 33 millimeters to 34 millimeters.

8. The control panel of claim 1 wherein each of the proximal wall, the opposing sidewalls, and the distal wall have a height within a range from 26 millimeters to 27 millimeters.

9. The control panel of claim 1 wherein the panel wall has a thickness within a range from 2.7 millimeters to 2.8 millimeters.

10. The control panel of claim 1 wherein the distal wall is slanted to form an angle with the panel wall within a range from 40 degrees to 50 degrees.

11. The control panel of claim 1 further comprising a lower aperture defined by lower edges of the proximal wall, the opposing sidewalls, and the distal wall.

12. The control panel of claim 1 further comprising an internal void defined by the proximal wall, the opposing sidewalls, the distal wall, and the panel wall.

13. The control panel of claim 1 wherein the control device comprises at least one of a toggle switch, a rotary dial, a light-emitting diode (LED), a rocker switch, a push button, and a round switch positioned at least partially within the aperture and attached to the panel wall.

14. The control panel of claim 1 wherein the control panel further comprises a storage aperture configured to facilitate the storage and retrieval of items within a storage tray comprised by a vehicle within which the control panel is at least partially positioned within.

15. The control panel of claim 1 wherein the control panel is configured to be positioned at least partially within at least one of a void and a storage tray comprised by a center console of a vehicle.

16. A control panel comprising:
a proximal wall;
a pair of opposing sidewalls attached at a proximal edge thereof to and extending distally from the proximal wall;
a slanted distal wall attached to a distal edge of the pair of opposing sidewalls;
a panel wall attached to an upper portion of and carried by at least one of the proximal wall, one of the opposing sidewalls, and the slanted distal wall, the panel wall comprising at least one aperture formed therein; and
a control device comprising at least one of a toggle switch, a rotary dial, a light-emitting diode (LED), a rocker switch, a push button, and a round switch positioned at least partially within the aperture of and attached to the panel wall;
wherein the panel wall is configured to extend outwardly beyond each of the proximal wall, the opposing sidewalls, and the slanted distal wall, defining a lip portion; and
wherein the lip portion of the panel wall is configured to interface with a structure of a center console of a vehicle.

17. The control panel of claim 16 wherein an aperture exists within a lower boundary of the control panel having its perimeter defined by lower edges of the proximal wall, the opposing sidewalls, and the slanted distal wall.

18. The control panel of claim 16 wherein the control panel is configured to be positioned at least partially within at least one of a void and a storage tray comprised by a center console of a vehicle.

19. A control panel comprising:
a proximal wall;
a pair of opposing sidewalls attached at a proximal edge thereof to and extending distally from the proximal wall;
a slanted distal wall attached to a distal edge of the pair of opposing sidewalls; and
a panel wall attached to an upper portion of and carried by at least one of the proximal wall, one of the opposing sidewalls, and the slanted distal wall;
wherein the panel wall comprises at least one aperture having a length within a range from 37 to 38 millimeters and a width within a range from 21 to 22 millimeters formed therein configured to receive a control device;
wherein the panel wall has a thickness within a range from 2.7 millimeters to 2.8 millimeters, a length within a range from 235 millimeters to 240 millimeters, and a width within a range from 33 millimeters to 34 millimeters;
wherein at least a portion of the panel wall extends outward beyond at least one of the proximal wall, the opposing sidewalls, and the slanted distal wall within a range from 1.70 millimeters to 1.75 millimeters;
wherein the slanted distal wall forms an angle with the panel wall within a range from 40 degrees to 50 degrees;
wherein each of the proximal wall, the opposing sidewalls, and the slanted distal wall have a height within a range from 26 millimeters to 27 millimeters; and
wherein the control panel is configured to be positioned at least partially within at least one of a void and a storage tray comprised by a center console of a vehicle.

* * * * *